United States Patent [19]

Cosenza

[11] Patent Number: 5,137,406

[45] Date of Patent: Aug. 11, 1992

[54] SHEAR-TRANSFER FASTENER ASSEMBLY

[75] Inventor: Frank J. Cosenza, Santa Barbara, Calif.

[73] Assignee: VSI Corporation, Torrance, Calif.

[21] Appl. No.: 741,688

[22] Filed: Aug. 7, 1991

[51] Int. Cl.⁵ ............... F16B 39/28; F16B 39/34
[52] U.S. Cl. ................. 411/113; 411/183; 411/432
[58] Field of Search ......... 411/103, 105, 108, 111, 411/112, 113, 183, 553, 549, 432

[56] References Cited

U.S. PATENT DOCUMENTS

| | | | |
|---|---|---|---|
| 2,414,272 | 1/1947 | Poupitch | 411/549 |
| 2,451,991 | 10/1948 | Swanstrom . | |
| 3,141,487 | 7/1964 | Boyd . | |
| 4,193,435 | 3/1980 | Charles et al. . | |
| 4,391,546 | 7/1983 | Lyon . | |
| 4,575,295 | 3/1986 | Rebentisch . | |
| 4,616,967 | 10/1986 | Molina . | |
| 4,730,967 | 3/1988 | Warkentin | 411/103 |
| 4,830,557 | 5/1989 | Harris et al. | 411/113 |
| 5,028,189 | 7/1991 | Harley | 411/113 |

Primary Examiner—Neill R. Wilson
Attorney, Agent, or Firm—Pretty, Schroeder Brueggemann & Clark

[57] ABSTRACT

A fastener assembly which includes a nut held loosely by a cage secured to an inaccessible surface of a panel. Serrations in the facing surfaces of the cage and the nut cause them to mutually interlock when pressed together by a tightened bolt passing through aligned apertures in the panel being fastened and the cage. The mutual interlocking of the nut and the cage, either directly or through an intermediate element, causes the assembly to transfer shear loads imposed by the bolt from the bolt aperture in the inner panel to the points where the cage holding the nut is attached to that panel.

9 Claims, 3 Drawing Sheets

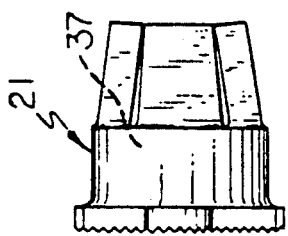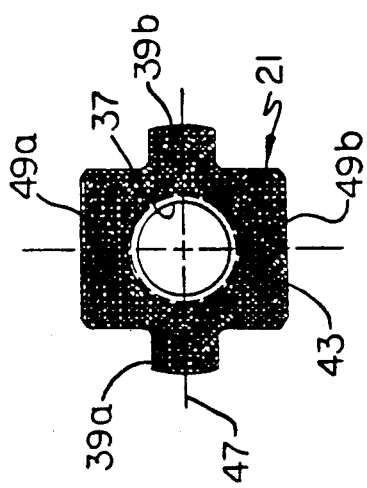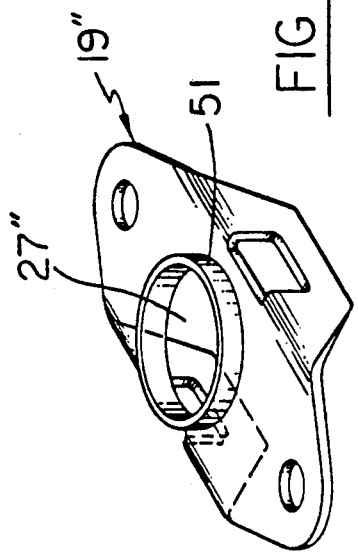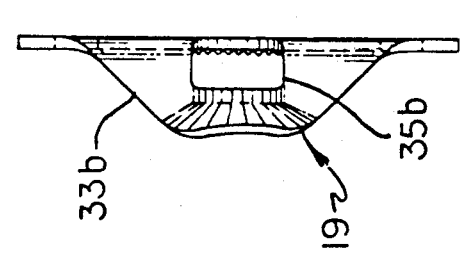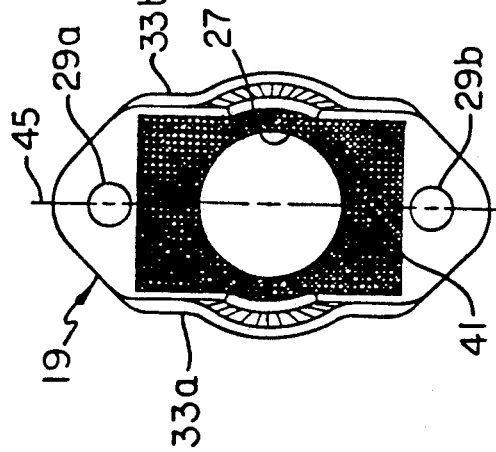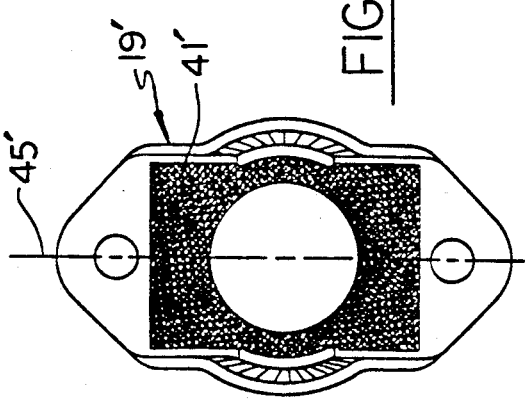

SHEAR-TRANSFER FASTENER ASSEMBLY

BACKGROUND OF THE INVENTION

This invention relates generally to threaded fastener assemblies and, more particularly, to threaded fastener assemblies employed in applications where shear loads are present.

Threaded fasteners of this particular kind are frequently used to secure an outer panel to an inner panel, where the back side of the inner panel is inaccessible. Typically, such fasteners include a threaded nut, held loosely and prevented from turning by a cage attached to the inaccessible side of the inner panel. A mating bolt extends through appropriately sized and aligned apertures in the two panels and the cage, to threadedly engage the nut.

Before the bolt is tightened, the nut is free to float within the cage and thereby to move laterally into alignment with the bolt. Once the bolt is tightened, the nut moves into compressive engagement with the facing surface of the cage. At that time, the nut's freedom to move laterally within the cage is reduced, but not eliminated, by the friction between it and the facing surface of the cage. The nut's freedom to move laterally and seat anywhere within the cage, even when axially compressed by the bolt against the cage, limits the fastener assembly's capacity to carry shear loads imparted by or to the bolt. Consequently, these loads are borne largely by the aperture formed in the panel, which is in contact with the bolt. A prolonged exposure of this type can enlarge the aperture to a point where the fastener assembly becomes incapable of transferring shear loads and can require time consuming and costly replacement or rework of the inner panel.

In other cases, it is desirable to enlarge the aperture in the inner panel, to accommodate the float of the nut within the cage and thereby facilitate a convenient use of the fastener assembly when the panels are misaligned. This purposeful enlargement of the panel aperture can diminish the assembly's ability to transfer shear loads.

It should, therefore, be appreciated that there is a need for a threaded fastener assembly capable of effectively transferring shear loads. The present invention fulfills this need.

SUMMARY OF THE INVENTION

The present invention is embodied in a threaded fastener assembly capable of effectively transferring shear loads. The fastener assembly includes a cage adapted to be secured to the back of an inner panel being fastened, a nut loosely retained by the cage in a position to threadedly receive and secure a bolt, and friction means between the nut and cage for transferring shear loads.

The friction means between the nut and cage may take the form of regular arrays of uniform V-groove serrations in the facing surfaces of the cage and nut, arranged substantially perpendicular to each other so that the two surfaces are brought into mating engagement with each other by the tightening of the bolt. The two sets of uniform V-grooves on the cage's surface may be arranged substantially parallel and perpendicular to the cage's longitudinal axis defined by a channel formed by the cage's two upraised walls, or at predetermined, mutually perpendicular angles relative to the cage's longitudinal axis. The two sets of uniform V-grooves in the surface of the nut are arranged substantially parallel and perpendicular to the nut's transverse axis defined by two tabs projecting outwardly from opposite sides of the nut.

For better mating of the facing surfaces of the cage and the nut when compressed by a tightened bolt, the two sets of mutually perpendicular V-grooves on the cage's surface may be skewed off its longitudinal and transverse axes, respectively, in the direction of the bolt's rotation when it is tightened. The two nut tabs projecting outwardly from opposite sides of the nut hold it loosely within the cage by extending into two slots in the cage's upended walls. These tabs are narrower than the slots, giving the nut freedom to line-up with, and threadedly receive, the bolt. When the bolt engages the nut, the friction between their respective threads causes the bolt to rotate the nut to an angular limit of its rotational freedom within the cage. For optimal mating of the facing surfaces of the nut and the cage, the angle of the V-grooves serrations on the surface of the cage matches the angular limit of the nut when tightened.

When even more precise alignment and certain mating of serrations on the confronting surfaces of the cage and nut is required, an intermediate member is disposed between the cage and the nut. The facing surfaces of the cage and the intermediate member have a series of uniform V-grooves arranged substantially perpendicular to the cage's longitudinal axis. The facing surfaces of the cage and the nut have a series of uniform V-grooves arranged substantially parallel with the nut's transverse axis. When the bolt is threaded tightly into the nut, the serrations on one side of the intermediate element engage with serrations in the cage surface, While the serrations on the other side of the element engage with serrations in the nut surface, effectively locking the cage and the nut in relation to each other via the intermediate member.

In applications where the shear loads exceed the capacity of the means securing the cage to the inner panel, e.g., rivets, to carry and transfer the shear loads to the inner panel, the distribution of these loads can be greatly enhanced by a collar formed integrally with the cage and tightly fitted into an appropriately sized aperture in the inner panel.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIGS. 2a and 2b are bottom and side views, respectively, of the cage portion of the fastener assembly of FIG. 1.

FIGS. 3a and 3b are top and side views, respectively, of the nut portion of the fastener assembly of FIG. 1.

FIG. 4 is a bottom view of a modified cage, with a regular array of serrations skewed at a predetermined angle relative to the cage's longitudinal axes.

FIG. 5 is a perspective view of the bottom side of a modified cage having a drawn shear collar.

DESCRIPTION OF THE PREFERRED EMBODIMENTS

Figure 1:
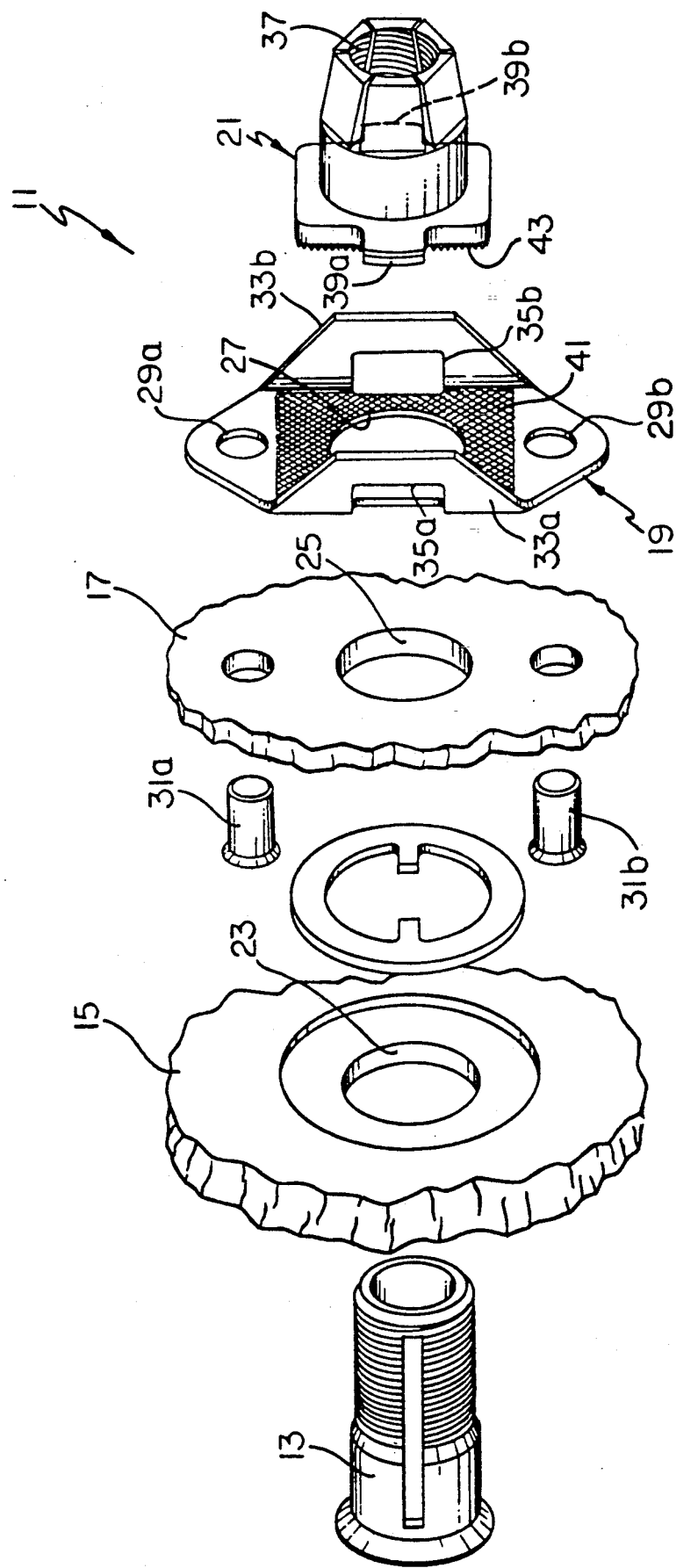
FIG. 1 is an exploded perspective view of a shear transfer fastener assembly in accordance with a first embodiment of the invention, shown in combination with a bolt for fastening together two panels.

With reference now to the drawings, and particularly FIGS. 1-3, there is shown a first embodiment of a fastener assembly 11 adapted to cooperate with a bolt 13 in fastening an outer panel 15 to an inner panel 17. The assembly includes a cage 19 secured to the inner surface of the inner panel and a nut 21 loosely retained by the cage, in general alignment with aligned apertures 23, 25 and 27 in the respective outer panel, inner panel and cage. The cage is formed of sheet metal and is generally elongated, with holes 29a and 29b at its opposite ends for cooperation with rivets 31a and 31b in fastening the cage to the inner panel. Upraised walls 33a and 33b are provided in the two opposed sides of the cage, each wall including a slot 35a or 35b. The nut includes a body with a threaded bore 37 and two tabs 39a and 39b projecting outwardly from opposite sides of the body. These tabs are disposed in the respective slots 35a and 35b of the cage walls 33a and 33b. This arrangement loosely retains the nut within the cage and prevents it from rotating about the axis of the nut's threaded bore.

The fastener assembly is used by inserting the bolt 13 through the aligned apertures 23, 25 and 27 in the respective panels 15 and 17 and cage 19, to threadedly engage the nut 21. The nut moves laterally, within limits imposed by the cage, into alignment with the bolt. Tightening the bolt compresses the nut against the cage, so that tensile forces are readily transferred between the bolt and the inner panel, via the nut and cage. In the past, shear forces have been transferred between the bolt and the inner panel by friction between the facing surfaces of the nut and cage and by direct engagement between the bolt and the inner panel. This has not always been satisfactory.

In accordance with the invention, the transferability of shear forces between the bolt 13 and the inner panel 17 is enhanced dramatically by providing the facing surfaces of the cage 19 and nut 21 with mating arrays of serrations 41 and 43, respectively. Each serration array includes mutually perpendicular sets of V-grooves that define between them an array of pyramidal projections. In the cage, which is shown in FIGS. 2a and 2b, the V-grooves are oriented generally parallel with, and perpendicular to, a longitudinal axis 45 defined by the two rivet holes 29a and 29b, while in the nut, shown in FIGS. 3a and 3b, the V-grooves are oriented generally parallel with, and perpendicular to a transverse axis 47 defined by the two tabs 39a and 39b. In use, when the bolt is tightened into the nut, the two arrays of serrations will be brought into mating engagement, such that shear forces along any direction transverse to the bolt's axis are readily transferred. This reduces the need to transfer such shear forces by the direct engagement of the bolt with the aperture 25 in the inner panel 17, thereby reducing wear and elongation of the aperture.

As shown more particularly in FIGS. 3a and 3b, the nut 21 has a body with a generally cross-shaped configuration in a plane perpendicular to the axis of its threaded bore 37. This cross-shaped configuration is characterized by two sets of opposing, generally rectangular protrusions or tabs projecting outwardly from the bore, along mutually perpendicular axes. These include the tabs 39a and 39b that, as previously mentioned, are disposed in the slots 35a and 35b of the cage walls 33a and 33b, as well as sides 49a and 49b that are aligned along the cage axis 45. These tabs and sides all cooperate to prevent the nut from rotating relative to the cage 19 about its threaded bore and to retain the nut within the cage when no bolt is present. These tabs and sides also serve to enlarge the nut's surface area in contact with the cage, for better distribution of tensile and shear loads. The array of serrations 41 in the facing surface of the cage match the mating array of serrations 43 in the facing surface of the nut and are similarly oriented.

Once the bolt 13 engages the nut's threaded bore 37, but before the bolt is sufficiently tightened to produce significant friction between the facing surfaces of the cage 19 and nut 21, the friction between the two sets of threads typically will cause the nut to rotate in concert with the bolt while the bolt is tightened, until the nut's rotation is arrested by the engagement of its tabs 39a and 39b with the slots 35a and 35b in the cage's respective upraised walls 33a and 33b. Once the nut reaches the limit of its rotation, ordinarily less than about 15 degrees of rotation, the nut is likely to remain at that angle relative to the cage's longitudinal axis 45, for as long as the bolt remains tight. Consequently, the mating arrays of serrations 41 and 43 in the facing surfaces of the respective cage 19 and nut 21 will not be precisely engaged with each other. This can reduce the assembly's capability of transferring shear forces. It will be appreciated, however, that limited shear transfer can still occur. This is because the mutually-perpendicular sets of V-grooves in the facing surfaces of the cage and nut define generally pyramidal projections. Even though the V-grooves in the facing surfaces might not be precisely aligned, sufficient individual pyramidal projections in the two surfaces will engage each other to provide at least limited shear transfer.

Sometimes, however, greater shear transfer capability is desirable. This can be provided by skewing the cage's serrations to better align with the serrations of the rotated nut 21. FIG. 4 depicts a cage 19' with mutually perpendicular serrations 41' arrayed at an angle of about 10 degrees relative to the cage's longitudinal axis 45'. This angle corresponds to the angle of the nut relative to the cage, at the limit of its rotation within the cage.

In most applications the transfer of shear loads from the bolt 13 to the nut 21 and cage 19, and from there to the inner panel 17 via rivets 31a and 31b attaching the cage to the inner panel, is effective in preventing the bolt from damaging the inner panel. The outer panel 15 usually is able to carry considerable shear loads without being damaged, because the bolt head is typically countersunk into the outer panel and the shear loads thus are distributed over a relatively large area. However, in applications where the shear loads exceed the inner panel's or the rivets' capacity to carry them, the distribution of these loads will be greatly enhanced by outfitting the cage with a shear collar. Such a cage 19'' is illustrated in FIG. 5. In this embodiment, the cage includes a drawn shear collar 51 aligned with its central aperture 27'', which fits tightly into an appropriately sized aperture in inner panel. For optimal shear distribution, the height of the collar should match the thickness of the inner panel with which it is used.

In some instances, shear transfer between the bolt, nut, cage, and panel must be complete and certain. This can be achieved by an alternate embodiment, shown in FIG. 6, in which an intermediate member 53 is interposed between a modified cage 55 and nut 57. The intermediate member is constrained to move only along the cage's longitudinal axis 59, while the nut is constrained to move only transversely relative to that axis. This is accomplished by providing the facing surfaces of the cage and the intermediate member with mating arrays of linear V-grooves 61a and 61b, respectively, oriented perpendicular to the cage's longitudinal axis 59, and by providing the facing surface of the intermediate member and the nut with mating arrays of linear V-grooves 65a and 65b, respectively, oriented parallel with the cage's longitudinal axis.

The intermediate member 53 resembles the cage in that it too includes two upturned facing walls 67a and 67b, which form a rectangular channel, and further includes slots 69a and 69b in the two facing walls. To limit the intermediate member to moving solely along the cage's longitudinal axis 59, its external width closely matches the internal width of the channel formed by the cage's upturned walls. To limit movement of the nut 57 relative to the intermediate member solely to a direction transverse to the cage's longitudinal axis, nut tabs 71a and 71b are sized to fit closely into the slots 69a and 69b in the walls of the intermediate member, while the body of the nut 57 is narrower than the width of the channel of the intermediate member. The two nut tabs 71a and 71b also extend through slots 73a and 73b in upturned, facing walls 75a and 75b of the cage 55. However, the cage's slots are wider than either the tabs or the corresponding slots 69a and 69b in the walls of the intermediate member 53.

Figure 6:
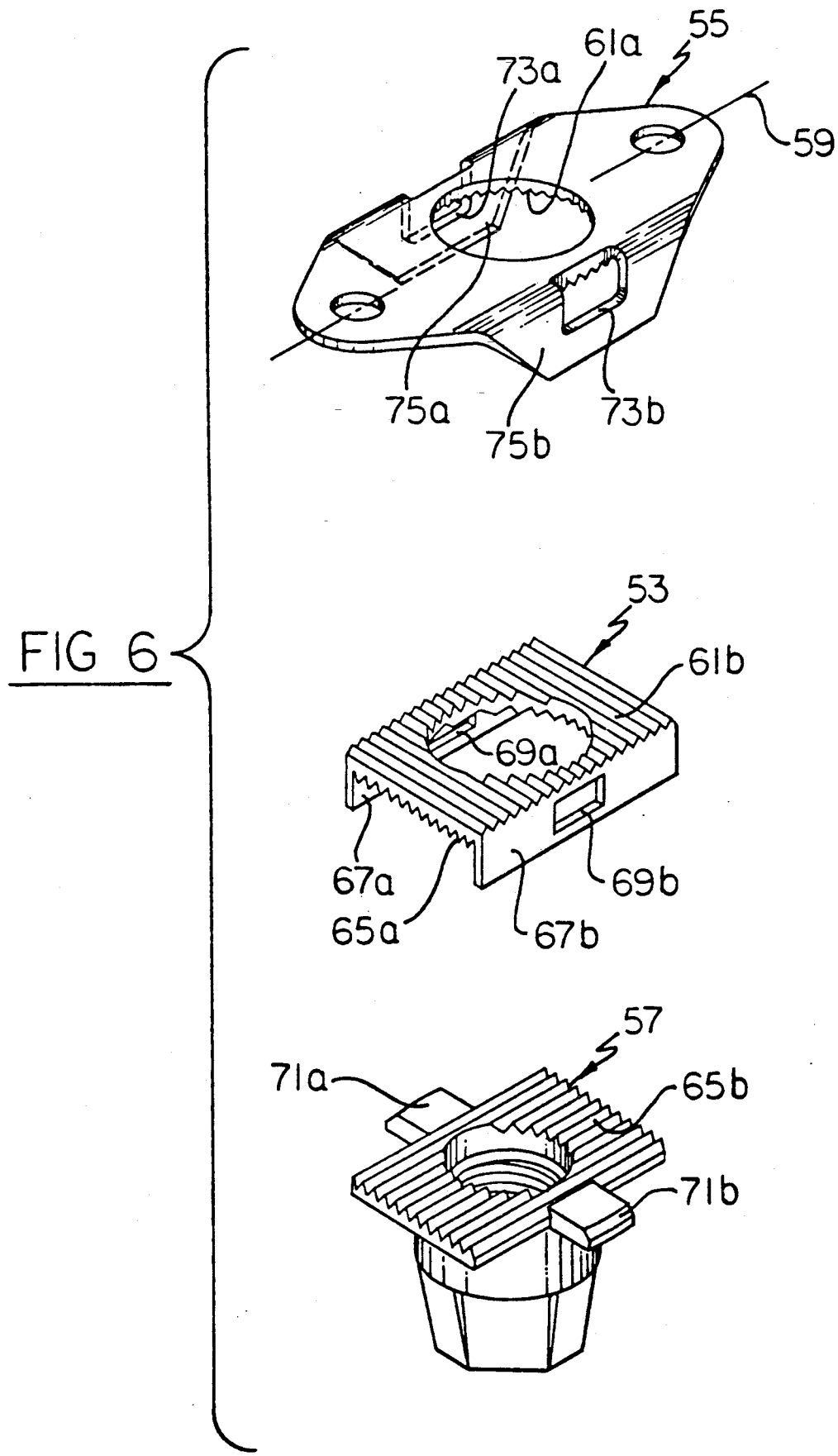
FIG. 6 is an exploded perspective view of a fastener assembly in accordance with a further embodiment of the invention, including a cage, a nut, and an intermediate member.

In the absence of a tensile load, or under only a light tensile load, the fastener assembly embodiment of FIG. 6 allows the nut 57 to move freely within the limits of the assembly, in a plane parallel to the panel surface. This enables the nut to align with the bolt (not shown in FIG. 6) passing through aligned apertures in the outer panel, inner panel and cage 55, while maintaining a constant orientation between the nut, the intermediate member 53, and the cage. This assures that when compressed together by the tightened bolt, the uniform V-grooves 61a and 61b in the facing surfaces of the cage 55 and the intermediate member 53 will fully engage each other, while the uniform V-grooves 65a and 65b of the facing surfaces of the nut 57 and the intermediate member likewise will fully engage each other, effectively fixing the nut's position relative to the cage. Once the bolt and the nut aperture are aligned, threaded and tightened, the whole assembly is in effect locked in place. Thereafter, shear loads along any direction are transferred between the bolt and the inner panel through the nut, the intermediate element, and the cage, rather than directly from the bolt to the inner panel aperture.

It should be appreciated from the foregoing description that the present invention provides an improved threaded fastener assembly capable of efficiently transferring shear loads between bolt and a panel to which the assembly is attached. The assembly includes a cage secured to the panel, for example by rivets, and a nut loosely confined by the cage. Threading the bolt into the nut tightens the nut against the cage, with a special arrangement of mating serrations in the facing surfaces of the nut and cage thereafter serving to transfer any shear forces. In an alternative embodiment, an intermediate element is interposed between the nut and the cage, to provide even greater shear transfer capability.

It also should be appreciated that even though all the fastener embodiments described here have a cage secured to an inner panel by rivets, other means of attachment, such as bonding, welding, etc., may be more appropriate under some conditions or for certain panel materials.

Although the invention has been described in detail with reference to the presently preferred embodiments, those of ordinary skill in the art will appreciate that various modifications can be made without departing from the invention. Accordingly, the invention is defined only by the following claims and equivalents thereof.

I claim:

1. A fastener assembly for fastening a bolt to a substrate, comprising:
    a cage adapted to be secured to the substrate to be fastened;
    a nut loosely retained by the cage in a position to threadedly receive and thereby secure the bolt; and
    friction means including regular arrays of serrations formed in surfaces of the cage and the nut for transferring shear loads between the cage and the nut when the bolt is threaded tightly into the nut
    wherein the cage and the nut have facing surfaces that engage each other when the bolt is threaded tightly into the nut;
    and wherein the regular arrays of serrations are formed in the facing surfaces of the cage and the nut, each regular array of serrations including two sets of uniform V-grooves arranged substantially perpendicularly to each other, such that the regular arrays of serrations are arranged in mating engagement with each other when the bolt is tightened into the nut.

2. A fastener assembly as defined in claim 1, wherein the V-grooves formed in the facing surfaces of the cage and the nut create a plurality generally pyramidal projections of substantially uniform size.

3. A fastener assembly as defined in claim 1, wherein:
    the cage is adapted to be secured to a substrate having a bore aligned with the nut being held by the cage, the bore being sized to receive the bolt; and
    the cage includes a cylindrical projection sized and positioned to project into the substrate bore and thereby assist in transferring shear loads between the bolt and the substrate.

4. A fastener assembly as defined in claim 1, wherein:
    the cage includes a sheet with two upraised walls defining therebetween a channel having a longitudinal axis, each wall having an elongated slot formed therein, and the cage further includes a bore aligned with the nut being loosely retained by the cage, the bore being sized to receive the bolt;
    the nut includes a body with a threaded bore and with two tabs projecting outwardly from opposite sides of the body, the two tabs defining a transverse axis and being received in the elongated slots of the two cage walls;
    the two sets of uniform V-grooves in the cage are arranged at predetermined, mutually perpendicular angles axis; and
    one set of uniform V-grooves in the nut is arranged substantially parallel with the nut's transverse axis, while the other set of uniform V-grooves in the nut is arranged substantially perpendicular to the nut's transverse axis.

5. A fastener assembly as defined in claim 4, wherein one set of uniform V-grooves in the cage is arranged substantially parallel with the cage's longitudinal axis, while the other set of uniform V-grooves in the cage is arranged substantially perpendicular to the cage's longitudinal axis.

6. A fastener assembly as defined in claim 4, wherein one set of uniform V-grooves in the cage is skewed at an acute angle from the cage's longitudinal axis, and the other set of uniform V-grooves in the cage is correspondingly skewed at an acute angle from the perpendicular to the cage's longitudinal axis.

7. A fastener assembly as defined in claim 6, wherein the acute angle is about 10°.

8. A fastener assembly for fastening a bolt to a substrate, comprising:
- a cage adapted to be secured to the substrate to be fastened, wherein the cage includes a sheet with two upraised walls defining therebetween a channel having a longitudinal axis, each wall having an elongated slot formed therein, wherein the cage further includes a bore sized to receive the bolt;
- a nut loosely retained by the cage and aligned with the bore in the cage, in a position to threadedly receive and thereby secure the bolt, wherein the nut includes a body with a threaded bore and with two tabs projecting outwardly from opposite sides of the body, the two tabs defining a transverse axis and being received in the elongated slots of the upraised walls of the cage; and
- friction means including
  - an intermediate member including a sheet with two upraised walls defining therebetween a channel having a longitudinal axis arranged substantially parallel with the cage's longitudinal axis, each wall having an elongated slot formed therein, the intermediate member being disposed between the cage and the nut such that the cage and the intermediate member having facing surfaces that engage each other when the bolt is threaded tightly into the nut and such that the intermediate member and the nut have facing surfaces that engage each other when the bolt is threaded tightly into the nut,
  - a series of uniform V-grooves formed in the facing surfaces of the cage and the intermediate member, the V-grooves being arranged substantially perpendicular to the cage's longitudinal axis, and
  - a series of uniform V-grooves formed in the facing surfaces of the intermediate member and the nut, the V-grooves being arranged substantially perpendicular to the nut's transverse axis.

9. A fastener assembly for fastening a bolt to a substrate, comprising:
- a cage adapted to be secured to the substrate to be fastened, wherein the cage includes a sheet with two upraised walls defining therebetween a channel having a longitudinal axis, each wall having an elongated slot formed therein, wherein the cage further includes a bore sized to receive the bolt;
- a nut loosely retained by the cage and aligned with the bore in the cage, in a position to threadedly receive and thereby secure the bolt, wherein the nut includes a body with a threaded bore and with two tabs projecting outwardly from opposite sides of the body, the two tabs defining a transverse axis and being received in the elongated slots of the upraised walls of the cage; and
- friction means including
  - an intermediate member including a sheet with two upraised walls defining therebetween a channel having a longitudinal axis arranged substantially parallel with the cage's longitudinal axis, each wall having an elongated slot formed therein, wherein the intermediate member being disposed between the cage and the nut such that the cage and the intermediate member having facing surfaces that engage each other when the bolt is threaded tightly into the nut and such that the intermediate member and the nut have facing surfaces that engage each other when the bolt is threaded tightly into the nut,
  - a series of uniform V-grooves formed in the facing surfaces of the cage and the intermediate member, and
  - a series of uniform V-grooves formed in the facing surfaces of the intermediate member and the nut, wherein the V-grooves in the facing surfaces of the cage and the intermediate member are arranged substantially perpendicular to the V-grooves in the facing surfaces of the intermediate member and the nut.

* * * * *